Aug. 5, 1969   R. FAHRBACH   3,459,385
TOROIDAL COIL WINDING MACHINE
Filed Oct. 23, 1965   4 Sheets-Sheet 4
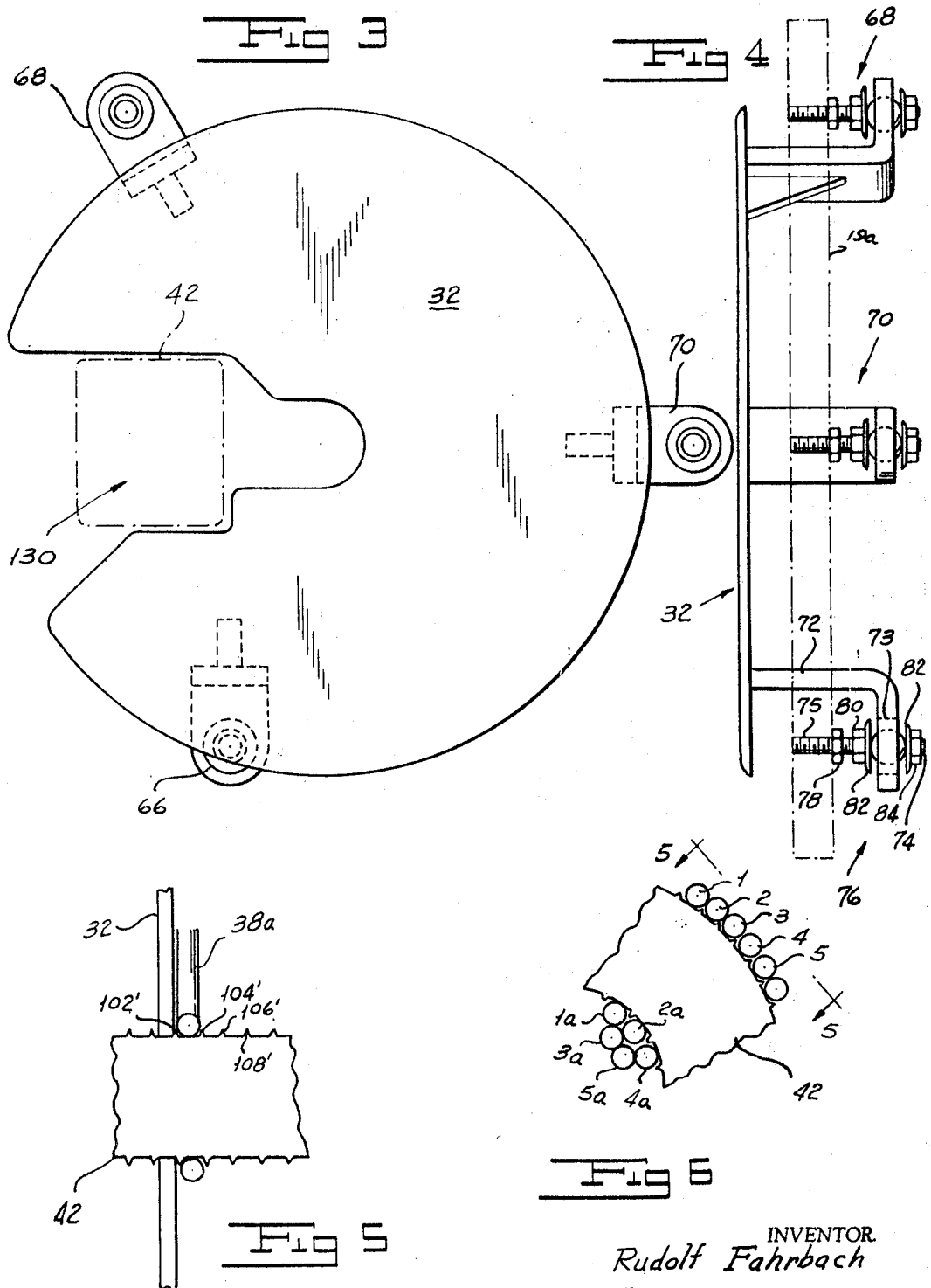
INVENTOR.
Rudolf Fahrbach
BY Rauber & Lazar
HIS ATTORNEYS United States Patent Office 3,459,385
Patented Aug. 5, 1969

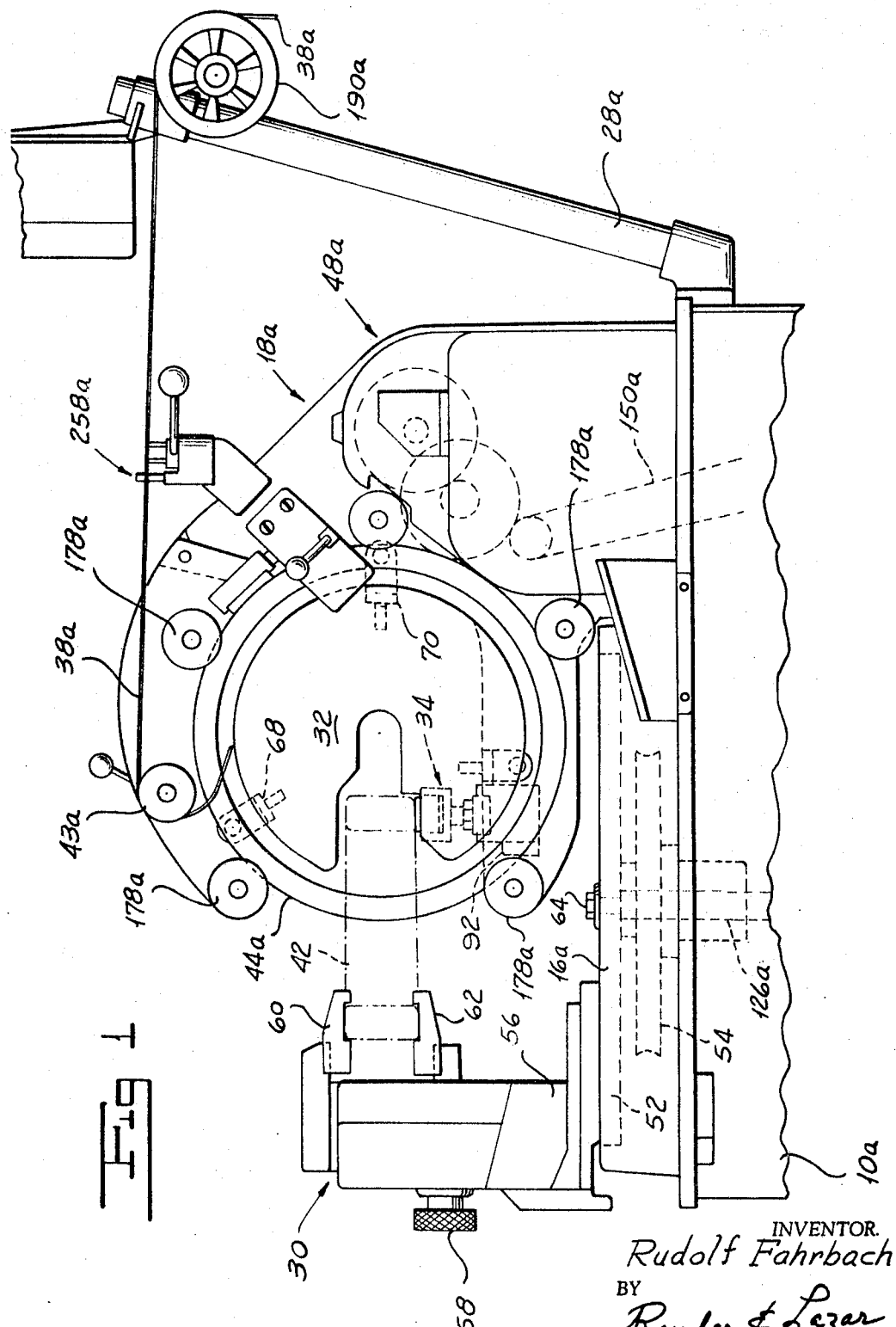

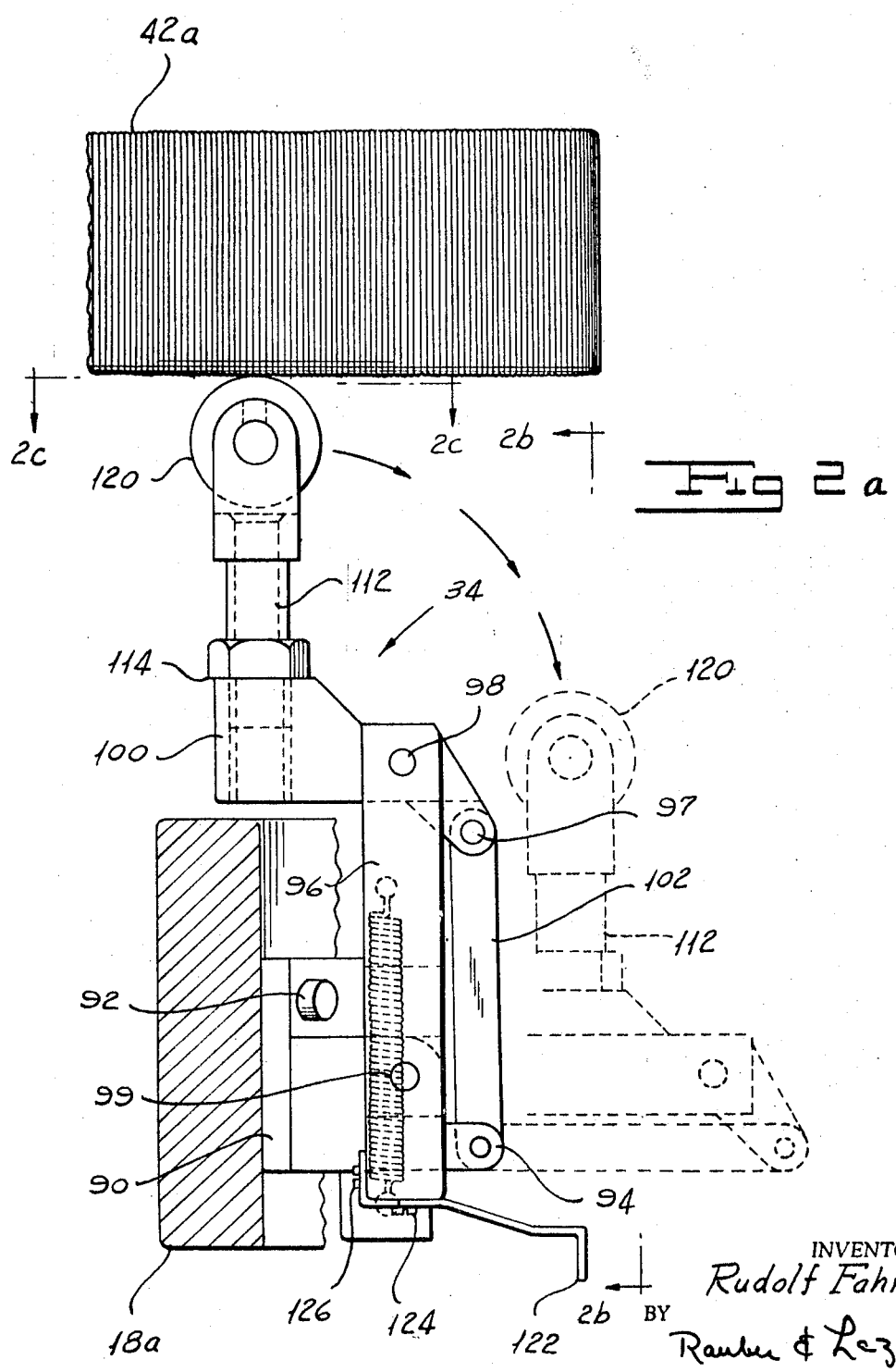

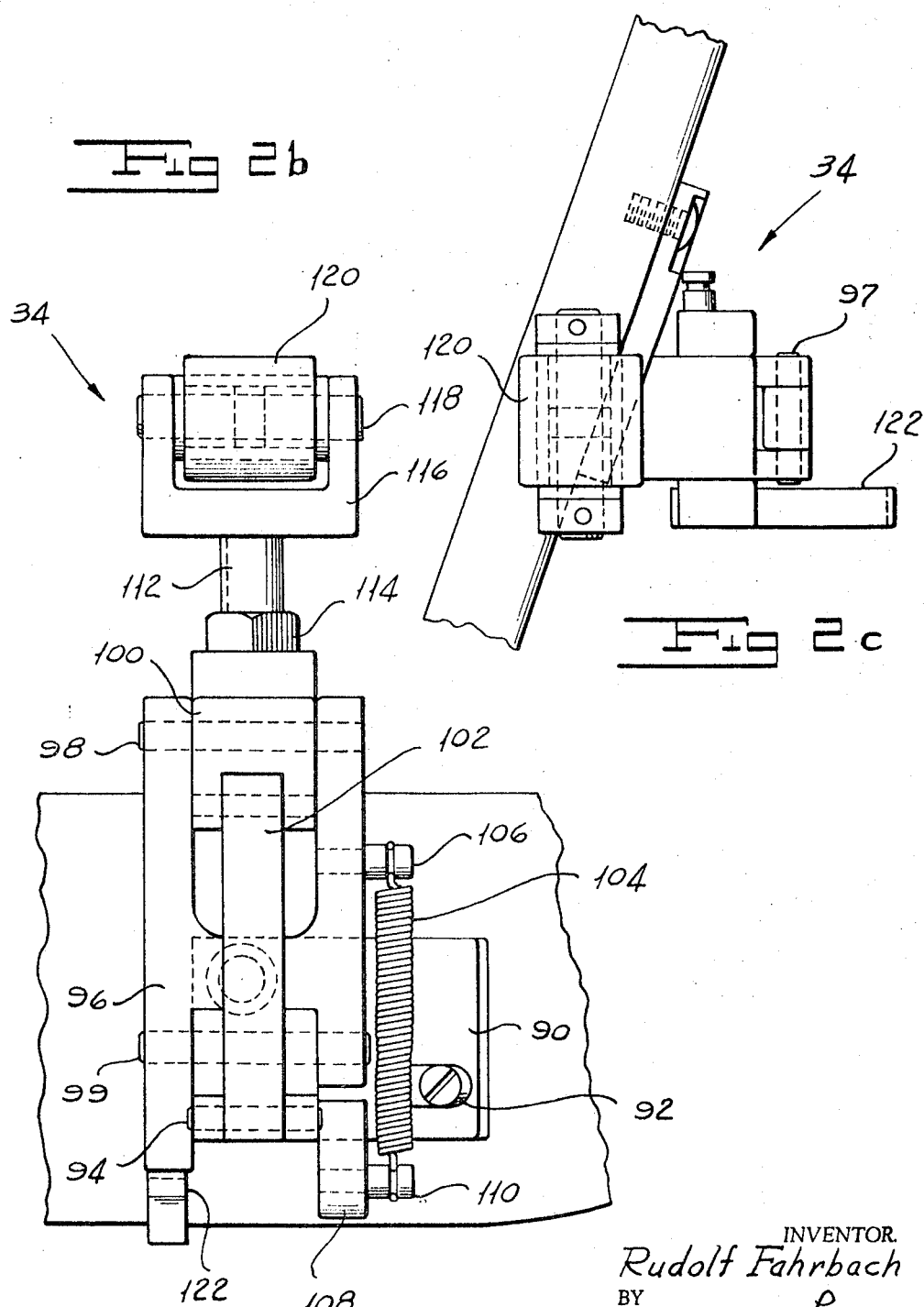

3,459,385
TOROIDAL COIL WINDING MACHINE
Rudolf Fahrbach, Union, N.J., assignor to Universal Manufacturing Company, Inc., Irvington, N.J., a corporation of New Jersey
Filed Oct. 23, 1965, Ser. No. 503,651
Int. Cl. B65h 81/02
U.S. Cl. 242—4      3 Claims

ABSTRACT OF THE DISCLOSURE

A toroidal coil winding machine provided with a clamp support for oscillating a core in timed relation with a shuttle and magazine for developing bank windings on the core. A two-position auxiliary roller support is arranged to support heavy cores in substantially diametrical opposite relation to the clamp. A precisely adjustable oriented guide plate is disposed in relation to the shuttle and core to effect a substantially radial or vertical leg on each turn of the winding on the core without allowing any slant or pitch in said portion of the turn.

---

This invention relates to a winding and reeling apparatus and is directed more particularly to the winding of toroidal coils.

Winding strand on toroidal cores to produce electrical devices such as Variacs and potentiometers involves the accurate positioning of adjacent turns of the strand in side-by-side relation whereby the turns are contiguous on the outer surface or periphery of the core in but a single layer while the turns of strand on the inner surface necessarily formed by the process cannot be side-by-side in a single layer since the arc for the inner core surface is shorter than the arc for the outer surface. Accordingly, since the wire thickness is uniformly constant, a given number of such turns on the outer surface per unit of arc length must produce a greater number of turns on the subtended arc of the inner surface. The art of winding such coil forms, more generally termed "bank winding," requires that in order to accurately place the turns on the outside diameter, there must be synchronization of the shuttle carrying the wire strand to be wound and the relative rotation of the core so that each wire strand is accurately guided and tightened on the surface of the core, with or without an angle of pitch of the turn portions. Also the turn portion on the inner surface of the core must be accurately overlapped so that the wire will not strain itself out of position on the outer surface.

Furthermore, the structural limitation of a shuttle which is to cooperate with a given core to wind turns thereon cannot be larger in cross-section than the inside diameter of the core since the shuttle must interlink the core. If the core diameter is substantially larger in cross-sectional area than the cross-sectional area of the shuttle mechanism, the winding speed must, according to the usually practiced procedures theretofore, be sufficiently slow to effect accurate control of the wire strand in the space between the shuttle and the core surface.

In order to increase the speed of operation, according to this invention, a guide plate is added in the space intermediate the shuttle and core to function as a baffle, or wall or the like, to guide the wire during the whipping or flying action naturally effected during increased speeds and high speed operation. The guide plate prevents the wire loops from flopping from the planar path within which they must be kept while the respective loops therefrom are tightened onto the core surface to form the bank-turns.

The usual toroidal coil winding machine is provided with means for frictionally driving the core on which windings are formed within three or more peripherally separated rollers, one or more of which is rotated to function as the drive-roller of the core. Such a mechanism is part of the well-known roller table portion of such machines. Such roller table means is not sufficiently accurate to provide bank windings on core at high winding speeds and particularly on core of large mass since the rollers slip and resiliently displace the core whereby turns are displaced on the core.

As is well known in the art, core of substantial dimension and mass is used for electrical devices for which large wire size and accordingly wire of significant stiffness create a concomitant increased difficulty for winding on toroidal cores. The increased strain on the wire needed during the loop-tightening phase of the winding operation puts greater structural strength requirements on the core rotation and support means.

It is a general objective of this invention to provide a winding machine for bank windings which is fast, accurate and is capable of winding core of a wide range of sizes and with wire of a wide range of diameters and stiffness.

It is a further objective of this invention to provide a winding machine for bank windings which overcomes the problems outlined above and advances in general the art of coil winding machines.

In accordance with one embodiment of the invention, I provide a clamp for holding the core along a small portion of its arc and for simultaneously rotating the core about a fixed axis of rotation accurately and in synchronism with the speed of rotation of the shuttle or magazine. A two-position roller support is provided arranged to have its axis of rotation along the plane of the radius of the center of rotation of the core while supporting the core for substantially the entire core winding phase and withdrawn from supporting position during the small portion of the winding phase during which the clamp must be rotated into close proximity with the shuttle or magazine. The roller-support is provided with spring-loaded trip means to withdraw the roller when needed. A guide plate, positioned in the path of the wire passing from the magazine to the core, is provided with three adjustable brackets having spherical bearings for precise orientation of the plate.

According to a feature of the invention, toroidal coil windings can be formed that do not follow the usual helical path wherein each portion of the turns are pitched as the wire is formed into turns. The turn portions can be kept from following the usual pitch of a helical winding by constraining the wire being peeled from the magazine or bobbin against the natural helix by a guide plate positioned in the path of the wire from the magazine to deflect or bend the wire in a direction away from the natural path of the usual helical winding heretofore practice in the art. The wire so constrained will be formed on the core adjacent the previous turn and thereby provide a non-helical winding. For such toroidal windings, the first turn is manually formed on the core according to the desired pitch for each portion of the turn. The guide plate thereafter in cooperation with the synchronized magazine and core rotation means continues forming the non-helical windings to the desired number of turns.

Other and further objects and features will appear from the following description.

In the accompanying drawing to which reference is made in the detailed description of one embodiment of the invention and in which like reference characters indicate identical parts in the various views:

FIG. 1 is a side view of the machine;
FIG. 2a is a side elevation of the core support assembly with the roller axis radial with the core;

FIG. 2b is a side elevation of FIG. 2a taken along the direction perpendicular to the radius of the core;

FIG. 2c is a view of the roller assembly of FIGS. 2a and 2b from the top view looking down on the machine;

FIG. 3 is a side elevation of the guide plate and mounting brackets;

FIG. 4 is an end view of FIG. 3;

FIG. 5 is a schematic showing the wire being guided on the core surface as viewed from a side elevation of the core; and FIG. 6 is a schematic showing the relation of the outer and inner turn positions of the windings being formed on the core.

Referring now to the drawing, particularly FIG. 1, there is shown a winding machine for toroidal coils useful for bank winding coils according to this invention. Such a machine is capable of being adapted for a plurality of toroidal coil winding operations and for such purposes is arranged to have interchangeable heads. A detailed description of such a universal machine is described in my copending application Ser. No. 441,472 filed on Mar. 22, 1965 and now Patent No. 3,383,059. Briefly, the machine includes a housing 10a (the reference numerals here are the same as the patent application with the letter a added) for supporting the structure on the floor having a motor and connecting linkages from the motor to drive various gear trains of the machine. Gear housing 16a is disposed on top of the housing structure 10a and includes a table or rotating disc 52 for support of a core clamp 30. In the rear (right side of FIG. 1) of the machine a gear box 48a is suitably mounted atop the housing and includes the coupling gears from the motor through the belt 150a. The magazine or shuttle and ring gear assembly 18a are suitably fixed to the housing 10a and include rollers 178a. Wire 38a is carried from a supply (not shown) over guide wheel 190a, through the wire cutting mechanism 258a, over wire guide assembly 43a, and onto the shuttle or magazine 44a in the usual manner. A toroidal core 42 is supported horizontally above the rotating disc 52 with its central axis directly above the axis of the drive shaft 126a.

The core is supported in a fixed position for rotation through an arc of 330° in the horizontal plane by core clamp assembly 30 adapted to be rotated by connection to the peripheral portion of disc 52. The core clamp assembly 30 comprises a core clamp housing 56 having screws and pinions operably adjusted by an adjusting knob 58 to separate and close the upper jaw 60 and the lower jaw 62, as desired according to the dimension of the core 42. The jaws 60 and 62 are made to conform to the core surface to assure a firm grip without play. The core assembly 30 is rigidly fixed to disc 52 and both are arranged to be rotated about the shaft 126a whereby the core 42 is rotated in synchronism with the rotation of the magazine 44a to wind the wire 38a on the surface of the core to effect a single layer of turns in side-by-side relation on the core as will be described in greater detail.

The motor within the housing 10a is suitably coupled to the gear train within gear box 48a by belts and the like and with suitable clutching arrangements, all of which are well known in the art and need not be further described here. Drive shaft 126a is actuated by the gear train, indicated generally as 54, through a pinion (for example, not shown) which drives the disc 52 through the desired angle of rotation, which may be within the range of 0–330°, corresponding to a predetermined number of revolutions of magazine 44a which releases the precise length of wire needed for the number of bank-winding turns required. It will be appreciated that a full 360° of rotation would be impossible in view of the structure of the magazine and gear assembly 18a in the path of core clamp 30.

Since the structural strength requirement of a core (42a) becomes more and more significant as the size of the core increases, and since great stresses are applied to the core as heavy wire (38a) is stressed to tighten the turns on the core, additional structural support of the core during the winding operation is not only desirable but in many cases essential. To support such cores, I provide a core support assembly 34 adapted to support core 42 within and closely adjacent the plane wherein the major stresses are applied, namely, near the portion of plane of magazine 44a linking the core.

The details of the core support assembly are shown in an isolated view as illustrated in FIGS. 2a, 2b, and 2c. The core support assembly 34 consists generally of a mounting plate 90 fixed by bolts through a slot 92 to the side wall of the magazine and gear assembly 18a as shown in FIG. 1.

Member 96 is pivotally connected by pin 99 to the plate and at the other end is pivotally connected by another pin 98 to the central member 100 which in turn is pivotally connected to member 102. A spring 104 connected to member 102 by pin 106 is connected to member 108 by pin 110. The upper end of member 100 is provided with a cylindrical recess for receiving rod 112 suitably threaded and fixed to member 100 by nut 114 for adjusting the length of rod 112. At the upper end of rod 112 is a U-frame 116 having an axle 118 journalled therein for carrying a rubber roller 120. The axis of the axle 118 is directed to the center of the core and thus intersects the projection of the axis of drive shaft 126a.

The core support assembly 34 is arranged to assume two positions each of which is maintained stable by spring 104. The pivot position 99 of the assembly is rigidly maintained about the plate 90 and a bolt through slot 92. The vertical member 96 carrying pins 98 and 99 is the controlling member of the mechanism to keep it in the "up" position as shown by the solid lines in the drawing, and to keep it in the "down" position as shown in phantom by the broken lines. A member 102 is linked to member 108 by a pin 94 serving as a fulcrum and to member 100 by a pin 97 also serving as a fulcrum. Member 96 is linked to member 108 at fulcrum point 99 by pin 99 and to member 100 by pin 98. Member 108 is fixed in a stationary position relative to the machine while member 100 is pivotally moving along a circular path described by member 102 about fulcrum 94 and member 96 about fulcrum point 99.

It will be noted that the four pins 94, 97, 98 and 99 define the parallelogram which keeps the rod 112 vertical in both the "down" and "up" positions. A trip member 122 is connected to member 96 by means of screws 124 and 126. The downward vertical extension portion of member 122 is so positioned as to contact a portion of the core clamp assembly 30 as the core clamp is rotated toward it. When the clamping member and assembly 30 strikes member 122, the up position of the core support assembly 34 is forced beyond a point of alignment of the fulcrum of lever 96 and the lower connection 110 of spring 104 which is termed as "top-dead-center" (TDC). The tension of spring 104 forces roller 120 from the "up" position as shown in solid lines to the "down" position shown in phantom by the dashed lines.

It is noted that by keeping the vertical support rod 112 in a vertical orientation in both the up and down position, the roller is moved with the minimum displacement between the two stable positions of the roller assembly. Furthermore, the assembly retracts rapidly from the lower portion of the core when triggered by lever 122 to assure thereby uninterrupted winding on the core. Accordingly, the core clamp 30 can be rotated through the maximum available arc of rotation to carry the remaining portion of core 42a into the winding plane of magazine 44a. Since the more significant stresses on the core are caused by tensioning the wire to form a turn the core clamp holding a core is sufficiently strong to support the core for this portion of the winding phase. Thus it is to be understood that, during this last phase of the bank winding operation, the core is supported only by the core clamp. I have discovered that this asymmetrical support, although not desirable, is satisfactory for the short period of time that is needed to complete the bank winding.

For the bank winding of the core the wire 38a must be guided from the magazine 44a into precise locations on the core. This is accomplished by the use of a guide plate 32 adjustably disposed within the magazine and shuttle assembly 18a, as shown in FIGS. 3 and 4. A different guide plate 32 is provided for each size of core to be wound particularly formed for the core to be wound with a cut-out 130. The plate is substantially flat and is oriented with respect to the plane of the shuttle or magazine 44a for each core size by means of three mounting brackets. Bottom guide plate support 66, top guide plate support 68 and horizontal guide plate support 70 provide the adjustable connections for orienting the guide plate with respect to the assembly 18a. The supports comprise an L-bracket 72 (see FIG. 4) welded or otherwise secured to the guide plate 32 and provided with a circular aperture 73 at the end thereof which end is bent to be substantially parallel with guide plate 32. The plate is connected to the frame plate 19a of the ring gear and shuttle assembly 18a by a threaded stud 74 theraded into a tapped hole 75 of the frame plate 19a. A nut 78 fixes the stud against the surface plate 19a, nut 80 is tightened against washer 82 while nut 84 is tightened against another washer 82 between which is gripped a spherical bearing 76. Pressure between the washers 82 causes the spherical bearing 76 to be expanded, i.e., shifted, within the aperture 73 to securely fix the orientation of the stud 74 with respect to the L-bracket 72. Accordingly, within small increments of angular orientation and lateral spacing, the guide plate 32 may be specially oriented within the assembly 18a. Because of the high precision positioning for each turn that is required, a different guide plate is required for each core size. The precise orientation of the guided plate is accomplished by adjusting the supports 68, 70 and 72. The contour cut-out 130 conforms to the cross-section of a core whereby the core is easily rotated through the fixed guide plate during the winding operation. Each core of the type on which bank windings are to be formed are usually provided with grooves or the like into which the turn portions are fitted. According to this embodiment a core of rectangular cross-section as shown in FIGS. 1 and 5, is provided with extensions or ears 102', 104', 106', 108', etc. at the corners of the surface of the core along the radial extension of the core, and are spaced on the outer two corners a sufficient distance to receive easily the desired wire. The spacing of adjacent ears on the inner two corners of the core will be slightly less than the outer ear spacings because the arc is shorter for the shorter radius. As the turns are formed the portions of each turn on the outer surfaces (note there are three outer surfaces and one inner surface in a rectangular core) are each adjacent the preceding and following turn and each is separated by an ear 102', 104', etc., as shown in FIG. 5. The inner surface, however, receives the turn portions on a two-layer staggered arrangement as shown in FIG. 6.

In operation, a core 42 is gripped between jaws 60 and 62 of the core support assembly 30 and the assembly 30 is rotated to the extreme counter-clockwise position as seen looking down on the machine. The leading end of the wire 38a, having been loaded on the magazine 44a in the well-known manner, is fixed to the core surface beneath one of the jaw members. The machine is placed in operation to cause the wire to be taken from the magazine by the usual eyelet guide, not shown, and placed on the surface of the core. The guide plate 32, appropriately oriented, keeps the wire deflected slightly thereby keeping the wire under sufficient strain to guide it into the grooves provided in the core and adjacent the previously wound turns.

As explained above and as illustrated in FIGS. 5 and 6, the bank windings are formed by the guide plate keeping the wire strand 38a under tension as it is taken from the magazine 44a. The guide plate is oriented very accurately so that the wire strand is guided into each successive groove. The core 42 is being rotated in angular speed in exact synchronism with the rotation of the gear and eyelet means withdrawing the wire strand from the magazine 44a. The turns are formed on the inner surface substantially as shown in FIG. 6 as a consequence of the core rotation and the wire following the previously formed turn portion. Thus turn portion 1 on the outer surface continues as portion 1a on the inner surface, portion 2 on the outer surface extends to portion 2a on the inner surface. It is noted that alternate turn portions are staggered in a double layer winding on the inner surface of the core.

As the winding is just about to be completed the core assembly 30 strikes the trip release member 122. The roller 120 is then dropped to the down-position providing sufficient space for the core support assembly to be rotated substantially adjacent the guide plate 32 to complete the final turns of the bank winding. In this manner the bank winding on the core is completed to the desired range and number of turns of winding.

In the winding of bank winding cores there is need for several types of windings. If the winding follows a true helix wherein each turn portion is slanted or pitched continuously, the placement of the turn portions accurately is not too serious a problem. However in certain types of bank windings the adjacent portions of one or more of the turns must be along a true vertical or along a true radial extension of the core without the slant or pitch that is inherent in a helical winding. Such precise requirements are needed in certain electrical components such as variometers, potentiometers and the like. According to this invention, such windings can be made to very high degree of accuracy and precision. To make such windings the first turn is placed on the core according to the required form of the winding desired. Thus, if the outer and inner turn portions are to be vertical, the turn is formed through corresponding ears on the same radius to cause the turn portion to be on the true vertical. One side leg can be made along the true radius while the remaining side leg, opposite the vertical leg formed as just described, must cross at an angle with the true vertical, as along a helical path, in order, naturally, to allow the wire to form the next turn. When the machine is placed in the winding phase of its operation, the wire guide plate constrains the wire being peeled from the magazine to follow the path defined by the first manually formed turn so that each subsequent turn precisely follows the same form of the preceding turn. It is to be especially noted that heretofore the usual solution to the problem of effecting a non-helical toroidal winding as, for example, the bank winding just described, on a continuously rotating core driven at a uniform speed, would require the core rotation speed to be made non-uniform or intermittent by appropriate but more complex gear systems and the like than are needed for the uniform continuous gear trains used according to this invention.

It will be understood that certain features and special combinations are of utility and may be employed without regard to other features and special combinations. This is contemplated by and is within the scope of my claims. Thus the roller support 34 although useful and advantageous in the winding of bank wound toroidal cores can be of utility in toroidal coil winding machines adapted for winding other types of toroidal core windings.

It is further obvious that various changes may be made in details within the scope of my claims without departing from the spirit of my invention. It is, therefore, to be understood that my invention is not to be limited to the specific details shown and described.

Having thus described my invention, what I claim is:

1. In combination with a toroidal coil winding machine adaptable to wind wire on a core, and having means to rotatably support said core comprising, a two-position core support having a roller for rotatably engaging the lower surface of a core in one of said positions, and means for withdrawing said roller from engagement with the core in the other of said positions, in a parallel but vertical orientation relative to said support position, said support including four links arranged in a parallelogram, said roller being supported by a member pivotally connected to the four links and arranged to be kept in the vertical for each of two said positions.

2. A toroidal coil winding machine having a shuttle adapted to be driven about its axis through a toroidal core, the shuttle having a groove for receiving wire wound in the groove, and means directing wire from a source to said shuttle, including in combination:

(a) a clamp having jaws for gripping a portion of said core;
(b) said clamp being rotatable in a plane parallel with the plane of the core and including means for supporting the core while rotating it;
(c) means for guiding wire from said shuttle for winding about the core; and
(d) plate means for deflecting the wire in the path between the shuttle and the core;
(d1) said plate means being disposed substantially within the plane defined by the shuttle, and being connected to said machine by a plurality of adjustable members to orient the plate so as to deflect said wire to form turns on said core each having one leg substantially radial or vertical without any slant or pitch relative to the radius or axis of said core;
(d2) said adjustable members including three angle brackets fixed to said plate, an aperture in each bracket, a shiftable bearing adjustably adapted for free orientation within each aperture, bolt means carrying said bearing and fixed to said machine, and means for forcibly shifting the bearing within the aperture thereby fixing in place the orientation of the plate relative to the machine.

3. A toroidal coil winding machine having a shuttle adapted to be driven about its axis through a toroidal core, the shuttle having a groove for receiving wire wound in the groove, and means directing wire from a source to said shuttle, including in combination:

(a) a clamp having jaws for gripping a portion of said core;
(b) said clamp being rotatable in a plane parallel with the plane of the core and including means for supporting the core while rotating it;
(c) means for guiding wire from said shuttle for winding about the core; and
(d) plate means for deflecting the wire in the path between the shuttle and the core;
(d1) said plate means being disposed substantially within the plane defined by the shuttle, and being connected to said machine by a plurality of adjustable members to orient the plate so as to deflect said wire to form turns on said core each having one leg substantially radial or vertical without any slant or pitch relative to the radius or axis of said core;
(e) a roller support for said core spaced from said clamp and fixed in radial position relative to the rotatable core, and means for withdrawing the support from said core.

References Cited

UNITED STATES PATENTS

| | | | |
|---|---|---|---|
| 1,807,651 | 6/1931 | Derry | 242—6 |
| 2,657,865 | 11/1953 | Bennert et al. | 242—4 |
| 2,726,817 | 12/1955 | Barrows | 242—4 |
| 2,850,247 | 9/1958 | Frederick | 242—4 |
| 3,050,266 | 8/1962 | Bucalo | 242—4 |

BILLY S. TAYLOR, Primary Examiner